United States Patent
Hansson

[19]
[11] Patent Number: 5,951,112
[45] Date of Patent: Sep. 14, 1999

[54] SEAT BELT DEVICE AND A METHOD FOR STABILIZING A SEAT BELT

[76] Inventor: Marianne Hansson, Odengaatan 10, Sandviken, Sweden

[21] Appl. No.: 08/716,309
[22] PCT Filed: Mar. 22, 1995
[86] PCT No.: PCT/SE95/00301
  § 371 Date: Nov. 22, 1996
  § 102(e) Date: Nov. 22, 1996
[87] PCT Pub. No.: WO95/25647
  PCT Pub. Date: Sep. 28, 1995

[30] Foreign Application Priority Data

Mar. 23, 1994 [SE] Sweden .................................. 9400960

[51] Int. Cl.⁶ ............................ B60R 22/00; A47C 31/00
[52] U.S. Cl. ........................................ 297/482; 280/801.1
[58] Field of Search .................................... 297/481, 482, 297/250.1, 256.15, 488; 280/801.1

[56] References Cited

U.S. PATENT DOCUMENTS

| | | | |
|---|---|---|---|
| 3,291,526 | 12/1966 | Nicholas | 297/482 |
| 3,291,528 | 12/1966 | Sencabaugh | 297/482 |
| 3,305,266 | 2/1967 | Nicholas et al. | 297/482 |
| 3,436,097 | 4/1969 | Love | 297/482 |
| 3,437,349 | 4/1969 | Feles et al. | 297/482 |
| 3,547,489 | 12/1970 | Grieser | 297/250.1 |
| 3,608,963 | 9/1971 | Steere, Jr. | |
| 3,841,658 | 10/1974 | Singh | |
| 4,129,320 | 12/1978 | Fancy | |
| 4,133,556 | 1/1979 | Glinski | |
| 4,141,573 | 2/1979 | Ellens | 297/482 |
| 4,878,277 | 11/1989 | Portuese | 297/482 |
| 4,928,992 | 5/1990 | Qvint et al. | |
| 4,944,530 | 7/1990 | Spurrier | 297/482 |

FOREIGN PATENT DOCUMENTS 0 516 512 A1  12/1992  European Pat. Off. .

OTHER PUBLICATIONS

Patent Abstracts of Japan, vol. 12, No. 222, M–712, Abstract of JP, A, 63–20249 (Toyota Motor Corp). Jan. 27, 1988.

*Primary Examiner*—Anthony D. Barfield
*Attorney, Agent, or Firm*—Burns, Doane, Swecker & Mathis, L.L.P.

[57] ABSTRACT

A vehicle having a safety belt mechanism includes a stabilizer for stabilizing a female buckle and its associated unstable belt. The stabilizer includes a recess for receiving portions of the female buckle and belt for stabilizing those portions and positioning the female buckle to face upwardly away from the seat. The stabilizer may comprise a single rigid element having a slit communicating with the recess for enabling the belt to be slid into the recess. Alternatively, the stabilizer may comprise halves that are interconnected about a pivot axis so as to swing together in order to capture the female buckle therebetween.

10 Claims, 2 Drawing Sheets

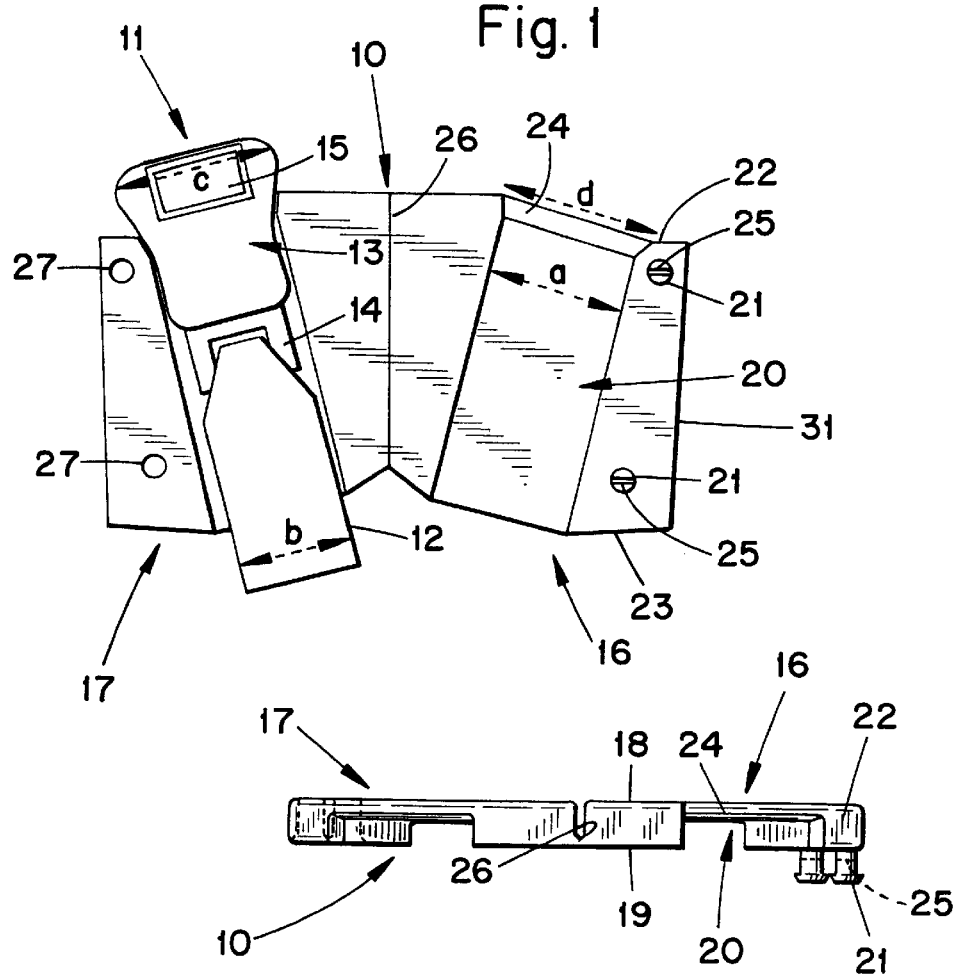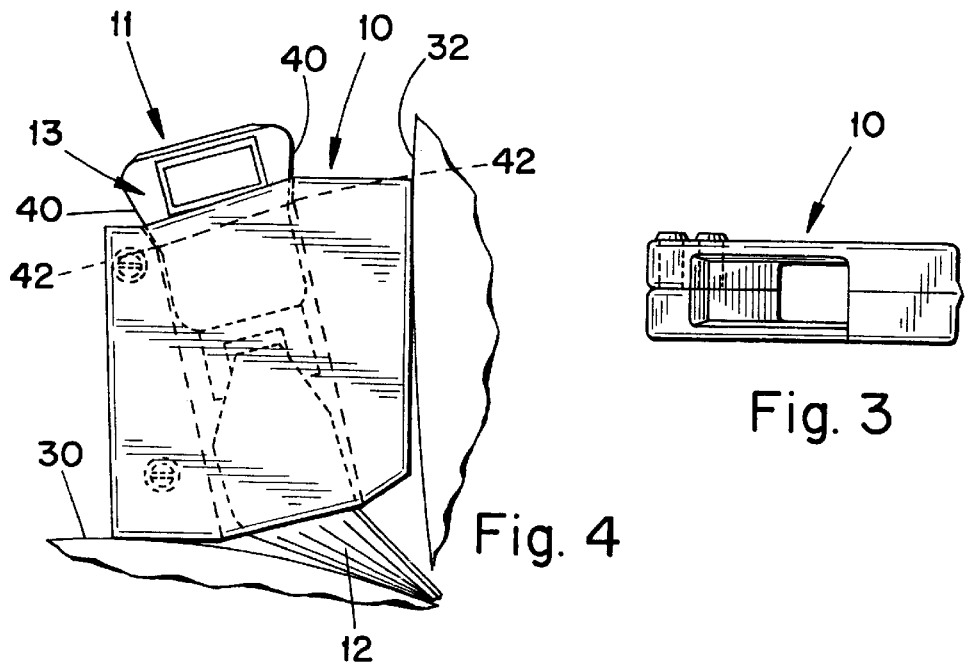

Fig. 5
Fig. 6
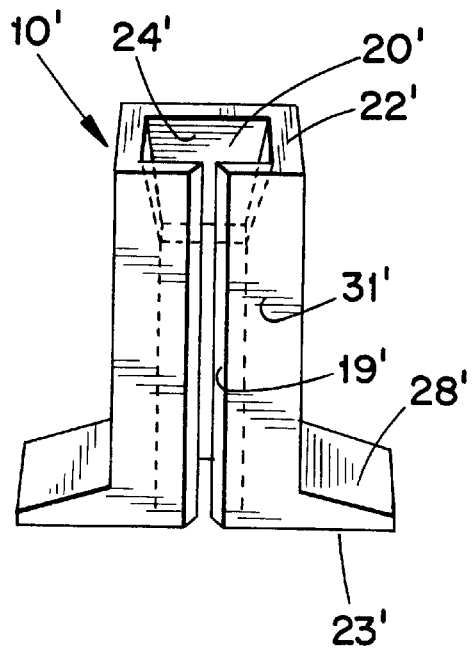
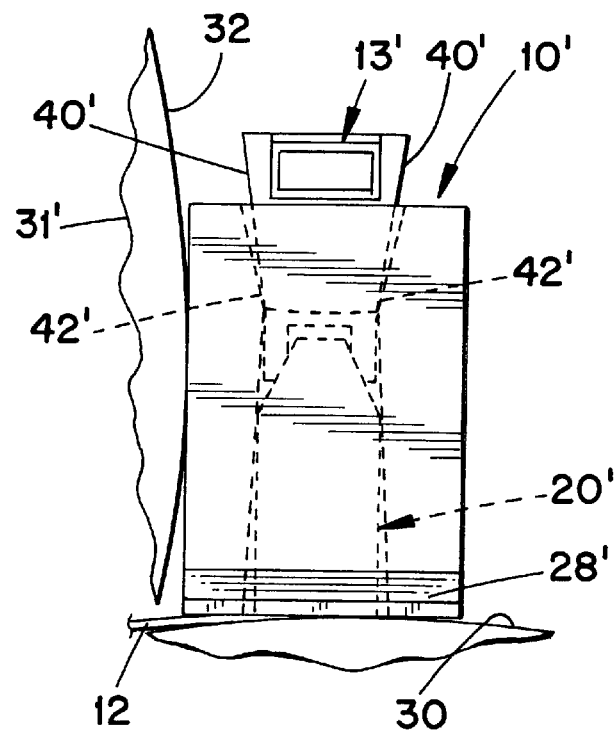
Fig. 7
Fig. 8
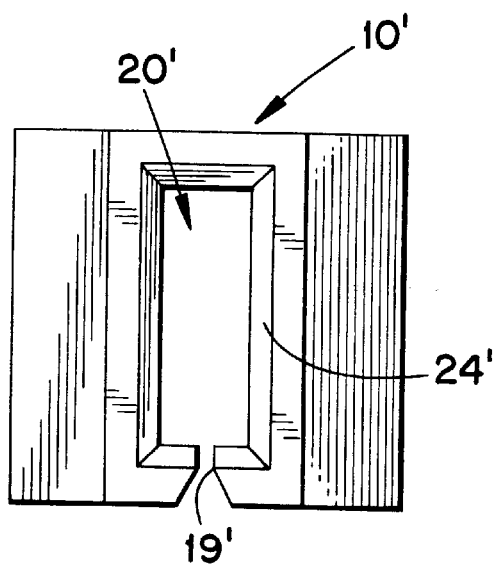
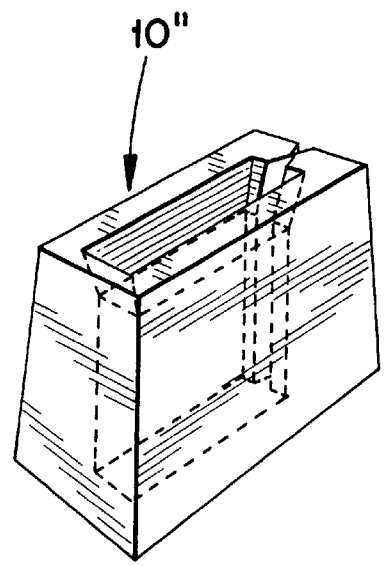

SEAT BELT DEVICE AND A METHOD FOR STABILIZING A SEAT BELT

BACKGROUND OF THE INVENTION

The present invention relates to a device for vehicles provided with safety belts. The safety belt has a buckle arrangement comprising a female portion attached to an unstable belt connected to the vehicle. The female portion can lie on a seat. The invention further relates to a method for stabilizing and positioning of a buckle arrangement.

Vehicles normally have relatively rigid buckle arrangements at the front seat, which facilitate latching or coupling. Many vehicles have safety belts, which at the rear seat consist of a buckle attached to an unstable belt connected to the vehicle. To be able to use these safety belts two hands are necessary and some skill to latch the male part to the buckle. For elderly or handicapped people and smaller children this can be difficult. Furthermore the unstable buckle arrangements may disappear down between the seat cushion and the back rest. This can lead to the safety belts not being used.

Through a number of patent documents such as JP-A-63-20249, U.S. Pat. No. 4,129,320, U.S. Pat. No. 4,133,556 and U.S. Pat. No. 4,928,992 different devices for stabilizing belt buckles are previously known. A common feature of the known devices is that these have been developed for assemblying during production of new cars and that they therefore cannot be used for cars that are already manufactured. The known stationary solutions are not practical for those who have problems with unstable and awkward belts in their actual car. This is even more unpractical as these require incisions such as slots in the seat cushions.

With known technique it has thus hitherto been impossible to stiffen the safety belt after the car has been manufactured. With the present invention it is possible to stabilize and position unstable belts by hand in both new and used vehicles having unstable belts.

One object of the present invention is to provide a device such that belt buckles can be stabilized by hand in an easy manner.

Another object of the present invention is to provide a device such that the safety belt can be latched with one hand in vehicles having unstable belts.

Still another object of the present invention is to provide a device such that belt buckles in vehicles with unstable belts maintain their positions even when they are not in use.

Still another object of the present invention is to provide a device such that all types of belt buckles in vehicles with unstable belts can be stabilized by hand in an easy manner.

Still another object of the present invention is to provide a device such that the seat cushion can be used as a counter support during latching and such that only the hand which is closest to the the buckle needs to be used.

Still another object of the present invention is to provide a device which is mountable and dismountable by hand when applicable into or out of a vehicles with unstable belts.

SUMMARY OF THE INVENTION

These and other objects have been achieved by providing a stabilizer in a vehicle. The vehicle comprises a generally horizontal seat, and a safety belt mechanism including a female buckle supported at one end of an unstable belt, with another end of the belt anchored within the vehicle. The stabilizer rests on the seat and includes a supporting portion receiving portions of the female buckle and belt for stabilizing those portions and positioning the opening of the female buckle to face upwardly away from the seat.

The invention also includes a method of stabilizing a female buckle of a safety belt mechanism utilizing the above-described stabilizer.

BRIEF DESCRIPTION OF THE DRAWINGS

FIG. 1 shows a device according to the present invention in an unassembled state, with a buckle arrangement, in a side view.

FIG. 2 shows a top view of the device according to FIG. 1.

FIG. 3 shows the assembled device in a top view.

FIG. 4 shows a side view of the device in FIG. 3.

FIG. 5 shows an alternative embodiment of a device according to the invention in a perspective view.

FIG. 6 shows a side view of the device according to FIG. 5 with a buckle arrangement.

FIG. 7 shows a top view of the device according to FIG. 5.

FIG. 8 shows another alternative embodiment of a device according to the invention in a perspective view.

DETAILED DESCRIPTION OF PREFERRED EMBODIMENT OF THE INVENTION

FIGS. 1 to 4 show a device 10 according to the present invention and a conventional buckle arrangement 11. The buckle arrangement 11 comprises an unstable belt 12 secured to a car body, not shown, and a buckle or female portion 13. The buckle in the shown embodiment tapers towards the belt 12 and has a truncated, irregular shape. The buckle is furthermore provided with an eye 14 to receive the belt, a push button 15 for releasing of the male part of the of the belt and an internal locking mechanism. The device 10 has a substantially rectangular basic shape both as unassembled (FIGS. 1 and 2) and as mounted (FIGS. 3 and 4). The device has two relative each other foldable halves; cover 16 and bottom 17. The cover 16 has two substantially plane parallel upper and lower faces 18 and 19. The lower face is provided with a substantially diagonal recess 20 and two diametrically resilient, projecting pins 21. The recess merges in the the top and bottom surfaces 22 and 23, respectively, of the device. The recess is provided with an expansion 24 in the vicinity of the top surface to form one half of a support for the buckle 13. The smallest width a of the recess is larger than the width b of the belt 12 but less than the largest width c of the buckle 13. The largest width d of the recess is preferably smaller than the largest width of the buckle in order to create a wedging effect between the recess and the buckle. Each of the pins 21 has a slot 25 extending axially in direction away from the free end of the pin. The slot makes the pin diametrically resilient. Alternatively the pin may have more slots. The free end of the pin has a radially extending flange which works as a snap lock at assemblying. The cover is integrally secured to the bottom 17 along a foldable hinge 26. The bottom is mirror imaged relative to the cover and has fastening holes 27 but otherwise it has the same shape as the cover.

The device functions as follows: At mounting of the device 10 the buckle arrangement is inserted into the recess of the bottom in a position according to FIG. 1. Then the cover is folded over the buckle arrangement such that the pins enter the corresponding holes. The cover is pressed hard against the bottom such that the pins are pushed through the holes and expanded, said cover and bottom thereby being locked to each other. Then the device is placed against at least the seat cushion whereafter the stabilized buckle arrangement is ready to be coupled with one hand. The stabilizer includes generally downwardly facing stop surfaces 40 which engage portions 42 of the female buckle to prevent the stabilizer from being removed vertically from the buckle. The device may be provided with a foot. It will be appreciated that the device 10 is connected to the vehicle solely through the belt 12.

An alternative embodiment of a device according to the present invention is shown in FIGS. 5 to 7. The device 10' has a substantially rectangular basic shape and is provided with a foot 28'. The foot is provided to lie against a seat cushion 30 and has a limited height in order not to be experienced by the belt user as bothering. The device has a substantially central, through-going recess 20' comprising an expansion 24' having a basic shape which tapers towards the foot. The recess is substantially symmetrical relative to a vertical center axis of the device. A slot 19' opens up a long side of the recess towards a side 31' of the device. The side 31' preferably faces the the back rest 32 of the seat. The slot has an entering bevel to facilitate insertion of the belt 12 into the device. The device is manufactured from a material, such as plastics, which allows an expansion of the width of the slot up to about a centimeter. The measures of the recess are substantially the same as mentioned in connection with the device 10.

The device functions as follows: At mounting of the device 10 the buckle arrangement is pulled out from the anchoring point at the car body as long as possible. Then the belt is inserted, for instance at the upper end of the slot and is then inserted through the slot and into the recess. Then the buckle is pressed down into the expansion of the recess such that the slot is expanded somewhat and such that the buckle is wedged up. The belt will not be wedged up by the device but will follow the movements of the buckle. The stabilizer includes generally downwardly facing stop surfaces 40' which engage portions 42' of the female buckle to prevent the stabilizer from being removed vertically from the buckle. Then the device is placed on the seat cushion and is balanced by the foot.

Another alternative embodiment of a device according to the present invention is shown in FIG. 8. The device 10" is shaped substantially in accordance with the device 10' but has a conical basic shape, in stead of a foot, which improves stability and a slot which is minimal.

Common for the different embodiments is that the device is a means 10;10';10' separate from the vehicle, which means is provided to position and stabilize the buckle. This is done by the means supporting at least against the seat cushion 30 of the vehicle while the means receives parts of the buckle and the belt.

The method of stabilizing and positioning of the buckle of the safety belt is generally performed for the three embodiments as follows. The unstable buckle is brought to contact with a means separate from the vehicle, said means being brought by hand to enclose parts of the buckle and the unstable belt above the seat cushion, said means retaining the buckle by elasticity or by a locking mechanism whereafter the means is placed against at least the seat cushion thereby maintaining the buckle in a desirable position. The buckle thereby achieves a position which in the vertical direction always is separated from the seat cushion and in the horisontal direction always is separated from the back rest. This results in that the buckle will be placed in a forward position which is comfortable for the user.

The device is not intended to absorb any tensional forces but will either be lifted from the seat cushion or will be disengaged from the buckle during load of the belt, such as at a sudden retardation of the vehicle.

Thus the present invention relates to a device for vehicles, which facilitates and contributes to the use of safety belts. The device stabilizes the buckle arrangement and prevents it from disappearing in under the seat cushion. The invention is not limited to the described embodiments but can be varied in numerous ways, such as introducing a soft collet in the recess of the device which functions as an adapter or holder for buckles of all constructions. The expansion may be rectangular or cylindrical in stead of conical if it can be accepted that the buckle is not completely rigidly held in the device. Furthermore different kinds of mechanisms, such as an O-ring in cooperation with two pins or screws on each side of the slot, can be used to inter lock the parts of the device that can be expanded. Additionally the device may be an integral part of for example a child pillow or child chair for car use.

I claim:

1. A vehicle comprising:

a generally horizontal seat;

a safety belt mechanism including a female buckle supported at one end of an unstable belt, with another end of the belt anchored within the vehicle; and a stabilizer resting on the seat and including a supporting portion receiving portions of the female buckle and belt for stabilizing those portions and engaging the female buckle for positioning an opening of the female buckle to face upwardly away from the seat, the stabilizer forming a through-hole having upper and lower ends spaced generally vertically from one another, the through-hole having at least two sides engageable with respective sides of the female buckle, a lower portion of the female buckle being disposed within the through-hole, and an upper portion of the female buckle being disposed above the upper end of the through-hole, the female buckle including a generally downwardly facing stop surface engageable with a portion of the stabilizer to prevent the stabilizer from being vertically removed from the female buckle, the stabilizer including relatively operable/closable sections for enabling the through-hole to be opened to insert or remove the female buckle.

2. The vehicle according to claim 1, wherein a sole connection of the stabilizer to the vehicle is through the belt.

3. The vehicle according to claim 1, wherein the sections of the stabilizer comprises two halves joined together to confine the belt and buckle portions therebetween.

4. The vehicle according to claim 3, wherein the halves are interconnected to swing relative to one another about a pivot axis.

5. The vehicle according to claim 1, wherein the upper end of the through-hole is expanded.

6. A vehicle comprising:

a generally horizontal seat;

a safety belt mechanism including a female buckle supported at one end of an unstable belt, with another end of the belt anchored within the vehicle; and a stabilizer resting on the seat and including a supporting portion receiving portions of the female buckle and belt for stabilizing those portions and engaging the female buckle for positioning an opening of the female buckle to face upwardly away from the seat, the stabilizer forming a through-hole having upper and lower ends spaced generally vertically from one another, the through-hole having at least two sides engageable with respective sides of the female buckle, a lower portion of the female buckle being disposed within the through-hole, and an upper portion of the female buckle being disposed above the upper end of the through-hole, the female buckle including a generally downwardly facing stop surface situated between upper and lower end of the female buckle and engageable with a portion of the stabilizer to prevent the stabilizer from being vertically removed from the female buckle, one of the sides of the through-hole including a slot enabling the female buckle to be inserted into or removed from the through-hole.

7. The vehicle according to claim 6, wherein the stabilizer includes lateral feet resting on the seat.

8. A method of stabilizing a female buckle of a safety belt mechanism in a vehicle, the vehicle including a generally horizontal seat on which an unstable belt is adapted to rest, the female buckle attached to an end of the belt, and another end of the belt anchored within the vehicle, the method comprising the steps of:

A) providing a stabilizer having a multi-sided through-hole including upper and lower ends spaced generally vertically from one another, the stabilizer including relatively openable/closable sections for opening/closing the through-hole, B) opening the sections of the stabilizer to open the through-hole, C) inserting the female belt into the opened through-hole such that a lower portion of the female buckle is disposed within the through-hole and an upper portion of the female buckle is disposed above the through-hole, and D) closing the sections to close the through-hole whereby at least two sides of the through-hole are engageable with respective sides of the female buckle to position an opening of the buckle to face upwardly away from the seat, and whereby a generally downwardly facing stop surface of the female buckle is engageable with a portion of the stabilizer to prevent the stabilizer from being vertically removed from the female buckle.

9. The method according to claim 8, further including resting the stabilizer on the seat such that a sole connection between the stabilizer and vehicle is through the belt.

10. A method of stabilizing a female buckle of a safety belt mechanism in a vehicle, the vehicle including a generally horizontal seat on which an unstable belt is adapted to rest, the female buckle attached to an end of the belt, and another end of the belt anchored within the vehicle, the method comprising the steps of:

A) providing a stabilizer having a multi-sided through-hole including upper and lower ends spaced generally vertically from one another, the through-hole having a slot extending through one of the sides; and B) inserting the belt through the slot such that a lower portion of the female buckle is disposed within the through-hole and an upper portion of the female buckle is disposed above the through-hole, and whereby at least two sides of the through-hole are engageable with respective sides of the female buckle to position an opening of the buckle to face upwardly away from the seat and whereby a generally downwardly facing stop surface of the female buckle is engageable with a portion of the stabilizer to prevent the stabilizer from being vertically removed from the female buckle.

* * * * *